US008953781B2

(12) United States Patent
Kim

(10) Patent No.: US 8,953,781 B2
(45) Date of Patent: Feb. 10, 2015

(54) APPARATUS AND METHOD FOR CIPHERING OF UPLINK DATA IN MOBILE COMMUNICATION SYSTEM

(75) Inventor: Hyo-Joon Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1201 days.

(21) Appl. No.: 12/703,008

(22) Filed: Feb. 9, 2010

(65) Prior Publication Data

US 2010/0202614 A1 Aug. 12, 2010

(30) Foreign Application Priority Data

Feb. 9, 2009 (KR) ........................ 10-2009-0010074

(51) Int. Cl.
*H04K 1/00* (2006.01)
*H04L 9/12* (2006.01)
*H04W 12/04* (2009.01)
*H04W 12/02* (2009.01)

(52) U.S. Cl.
CPC ................. *H04L 9/12* (2013.01); *H04W 12/04* (2013.01); *H04W 12/02* (2013.01)
USPC ............................................ 380/27; 713/151

(58) Field of Classification Search
CPC ..... H04L 63/00; H04L 63/04; H04L 63/0428; H04L 9/00; H04L 9/06; H04L 9/065; H04L 9/08; H04L 9/0816; H04L 9/0861; H04L 9/12; H04W 12/04
USPC ........... 380/247, 249, 255, 260–262, 274, 42; 713/150, 160, 400, 500–503; 340/324, 340/350, 503–504, 507, 509
See application file for complete search history.

(56) References Cited

U.S. PATENT DOCUMENTS

| | | | | |
|---|---|---|---|---|
| 6,768,903 B2* | 7/2004 | Fauconnier et al. | .......... | 455/403 |
| 6,842,445 B2* | 1/2005 | Ahmavaara et al. | .......... | 370/349 |
| 6,870,932 B2* | 3/2005 | Jiang | ............................ | 380/273 |
| 6,925,298 B2* | 8/2005 | Ho | ................ | 455/411 |
| 6,968,200 B2* | 11/2005 | Kuo | ................ | 455/515 |
| 7,020,455 B2* | 3/2006 | Krishnarajah et al. | ........ | 455/410 |
| 7,039,407 B2* | 5/2006 | Sipila et al. | .................... | 455/436 |
| 7,085,294 B2* | 8/2006 | Longoni et al. | ............... | 370/509 |
| 7,126,936 B2* | 10/2006 | Herrmann et al. | ............ | 370/350 |
| 7,289,630 B2* | 10/2007 | Vialen et al. | .................. | 380/201 |
| 7,356,146 B2* | 4/2008 | Yi et al. | ........................ | 380/262 |
| 7,801,297 B2* | 9/2010 | Ida et al. | ........................ | 380/28 |
| 8,184,612 B2* | 5/2012 | An | ................ | 370/350 |
| 2003/0031322 A1* | 2/2003 | Beckmann et al. | ........... | 380/278 |
| 2003/0076859 A1* | 4/2003 | Jiang | ............................ | 370/509 |
| 2003/0091048 A1* | 5/2003 | Jiang | ............................ | 370/392 |
| 2003/0157927 A1* | 8/2003 | Yi et al. | ........................ | 455/411 |
| 2003/0235212 A1* | 12/2003 | Kuo | ................ | 370/503 |
| 2005/0021945 A1* | 1/2005 | Niemi et al. | .................. | 713/163 |
| 2005/0163080 A1* | 7/2005 | Suh et al. | ...................... | 370/331 |
| 2005/0245276 A1* | 11/2005 | Torsner | ........................ | 455/502 |
| 2005/0265551 A1* | 12/2005 | Hara | ............................ | 380/270 |
| 2007/0204159 A1* | 8/2007 | Hara | ............................ | 713/171 |
| 2007/0258591 A1* | 11/2007 | Terry et al. | .................... | 380/247 |
| 2008/0226074 A1* | 9/2008 | Sammour et al. | ............ | 380/270 |
| 2009/0122762 A1* | 5/2009 | Kitazoe et al. | ................ | 370/331 |
| 2009/0168723 A1* | 7/2009 | Meylan | ........................ | 370/331 |
| 2009/0220079 A1* | 9/2009 | Harada et al. | ................. | 380/252 |

* cited by examiner

*Primary Examiner* — Saleh Najjar
*Assistant Examiner* — Eric W Shepperd
(74) *Attorney, Agent, or Firm* — Jefferson IP Law, LLP

(57) ABSTRACT

An apparatus and method for ciphering uplink data in a mobile communication system are provided. The apparatus includes a Radio Network Controller (RNC) for, when receiving a Radio Bearer Setup Complete after a ciphering activation time, determining a Hyper Frame Number (HFN) value of a User Equipment (UE) and changing an HFN value of the RNC to the same HFN value determined of the UE.

15 Claims, 6 Drawing Sheets

APPARATUS AND METHOD FOR CIPHERING OF UPLINK DATA IN MOBILE COMMUNICATION SYSTEM

PRIORITY

This application claims the benefit under 35 U.S.C. §119(a) of a Korean patent application filed in the Korean Intellectual Property Office on Feb. 9, 2009 and assigned Serial No. 10-2009-0010074, the entire disclosure of which is hereby incorporated by reference.

BACKGROUND OF THE INVENTION

1. Field of the Invention

The present invention relates to a $3^{rd}$ Generation Partnership Project (3GPP) Technical Specification (TS) security method in an asynchronous mobile communication system. More particularly, the present invention relates to an apparatus and a method for regulating a Hyper Frame Number (HFN) and performing the same ciphering between a user equipment and a base station to protect data transmitted in a poor uplink radio environment of a mobile communication system.

2. Description of the Related Art

According to a $3^{rd}$ Generation Partnership Project (3GPP) standard specifying an asynchronous mobile communication system, ciphering/deciphering of Radio Link Control (RLC) Transparent Mode (TM) is carried out in a Medium Access Control (MAC) layer. In a ciphering/deciphering process, a 32-bit ciphering sequence number COUNT-C is given as an input parameter for a ciphering/deciphering algorithm.

FIG. 1A depicts a conventional COUNT-C defined in the 3GPP TS.

Referring to FIG. 1A, one COUNT-C specified by the 3GPP TS is provided per uplink Radio Bearer and downlink Radio Bearer using an RLC Acknowledged Mode (AM) 105 or RLC Unacknowledged Mode (UM) 103. The COUNT-C is identical for every TM mode RLC radio bearer of the same Core Network (CN) area and for the uplink and the downlink.

The constitution of the COUNT-C varies according to the RLC mode, and a User Equipment (UE) and a Radio Network Controller (RNC) perform the ciphering with the same COUNT-C value. The COUNT-C used for the ciphering in an RLC TM 101 includes a Hyper Frame Number (HFN) and a Connection Frame Number (CFN). In every 10 ms the CFN increases by one and has a range of 0~255. When the CFN reaches 255, the CFN becomes zero after 10 ms. The CFN range of 0~255 is referred to as one cycle. When the CFN becomes zero of a next cycle, the HFN increases by one.

FIG. 1B illustrates a ciphering process of a conventional mobile communication system.

Referring to FIG. 1B, when the mobile communication system does not normally receive a message or data from a UE during a poor uplink radio environment, the mobile communication system retransmits the message or data for several times using an RLC protocol.

The mobile communication system uses a Radio Resource Control (RRC) Radio Bearer Setup message and an RRC Radio Bearer Setup Complete message as an uplink message for voice or a video call setup. After transmitting the RRC Radio Bearer Setup Complete to the RNC and a ciphering activation time passes, the UE increases the HFN by one every time the CFN (0~255) of a cycle of 256 becomes zero and performs the ciphering using the cycle of 256 as a factor of the ciphering algorithm.

However, if it is determined that the RRC Radio Bearer Setup Complete message is not received from the UE, the RNC cannot conduct the ciphering. When the RRC Radio Bearer Setup Complete is received afterwards, the RNC cannot perform a normal ciphering because of the different HFN values based on the HFN increased by the UE.

Moreover, because of the HFN difference, the UE cannot normally decipher and decode data encoded and received from the mobile communication system. As a result, the voice and images are compromised.

Therefore, a need exists for an apparatus and method for ciphering transmitted data in a poor uplink radio environment in a mobile communication system.

SUMMARY OF THE INVENTION

An aspect of the present invention is to address at least the above-mentioned problems and/or disadvantages and to provide at least the advantages described below. Accordingly, an aspect of the present invention is to provide an apparatus and a method for ciphering to protect data transmitted in a poor uplink radio environment of a mobile communication system.

Another aspect of the present invention is to provide an apparatus and a method for enabling the same ciphering between a user equipment and a radio network controller when a delay occurs because of a poor uplink radio environment in a mobile communication system.

Yet another aspect of the present invention is to provide an apparatus and a method for regulating a Hyper Frame Number (HFN) for the same ciphering between a user equipment and a base station in a mobile communication system.

Still another aspect of the present invention is to provide an apparatus and a method for checking an HFN control range for ciphering at the same time in a user equipment and a base station by determining a Radio Network Controller (RNC) Frame Number (RFN) of a movement time to a new physical channel and an RFN of a ciphering activation time in a mobile communication system.

In accordance with an aspect of the present invention, an apparatus for ciphering uplink data in a mobile communication system is provided. The apparatus includes a Radio Network Controller (RNC) for, when receiving a Radio Bearer Setup Complete after a ciphering activation time, determining a Hyper Frame Number HFN value of a User Equipment (UE) and changing an HFN value of the RNC to the same HFN value determined of the UE.

In accordance with another aspect of the present invention, a method for ciphering uplink data in a mobile communication system is provided. The method includes when receiving a Radio Bearer Setup Complete after a ciphering activation time, determining an HFN value of a UE, and changing an HFN value of a RNC to the same HFN value determined of the UE.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, like reference numerals will be understood to refer to like parts, components, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Exemplary embodiments of the present invention provide an apparatus and a method for regulating a Hyper Frame Number (HFN) for the same ciphering between a User Equipment (UE) and a base station using a Radio Network Controller (RNC) Frame Number (RFN) of a movement time to a new physical channel and an RFN of a ciphering activation time to cipher and protect data transmitted in a poor uplink radio environment of a mobile communication system.

Figure 1A:
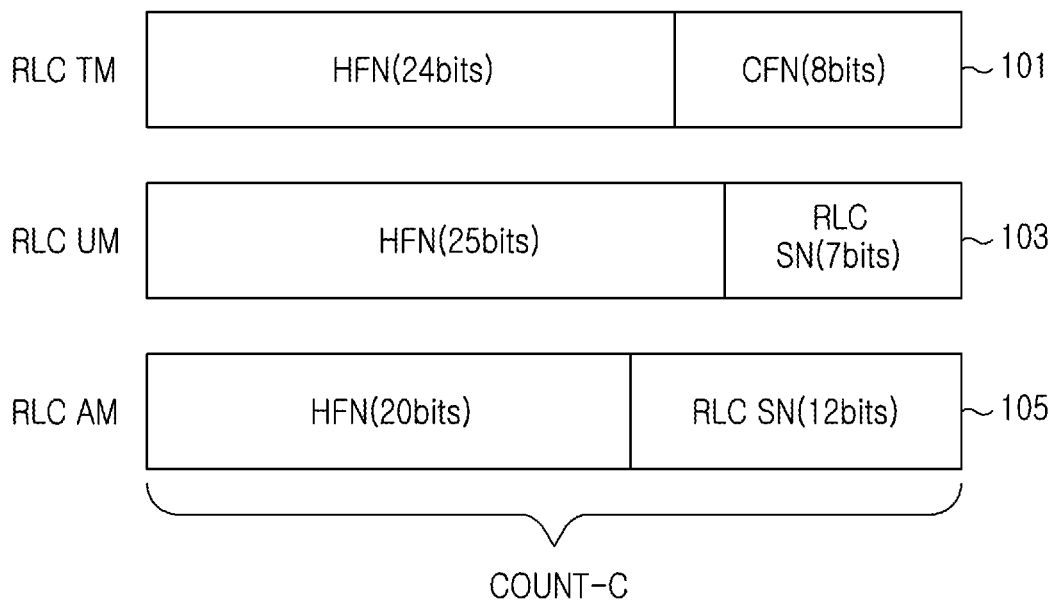
FIG. 1A is a conventional diagram of a ciphering sequence number COUNT-C specified by the 3$^{rd}$ Generation Partnership Project 3GPP Technical Specification (TS)
Figure 1B:
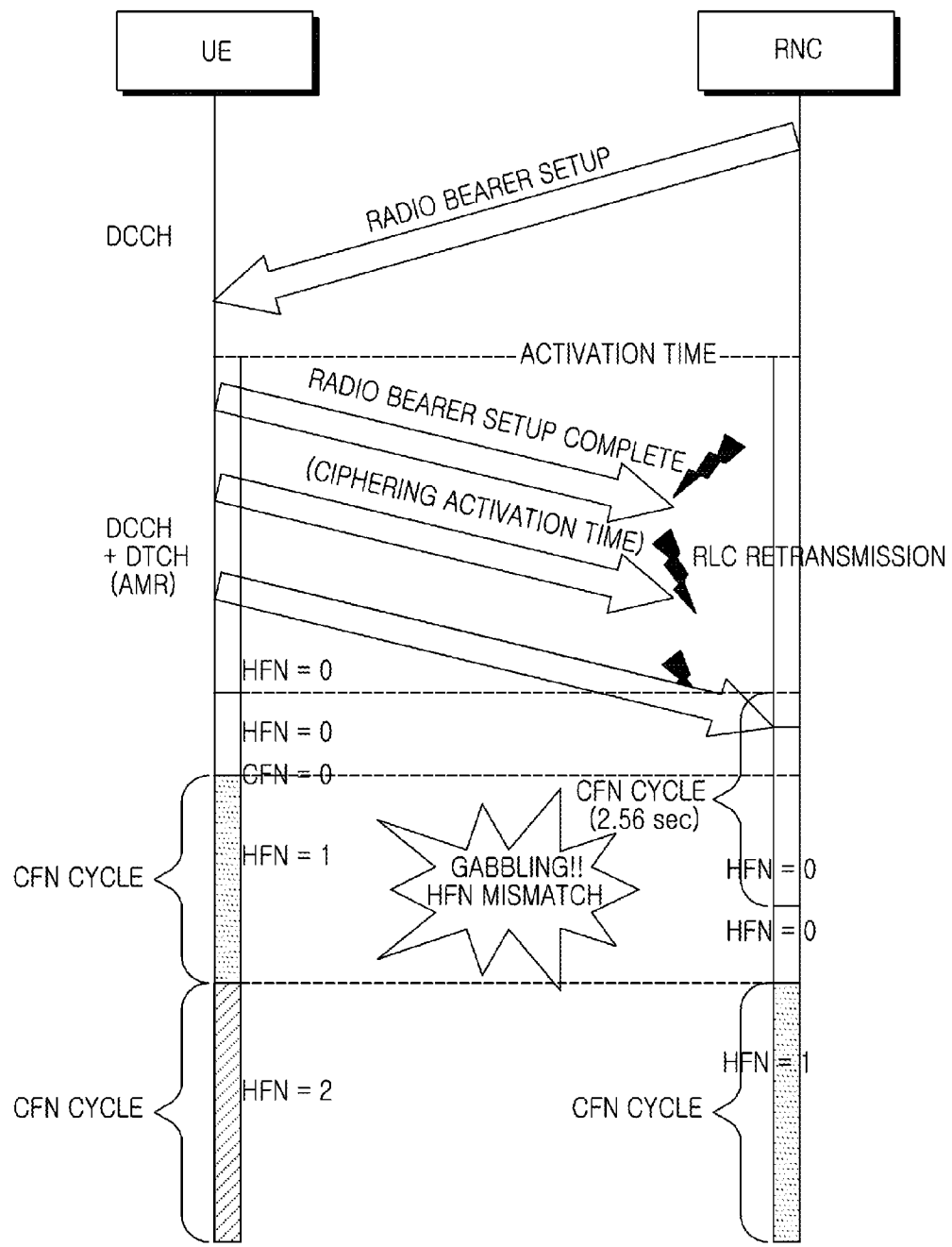
FIG. 1B is a diagram of a ciphering process of a conventional mobile communication system.
Figure 2:
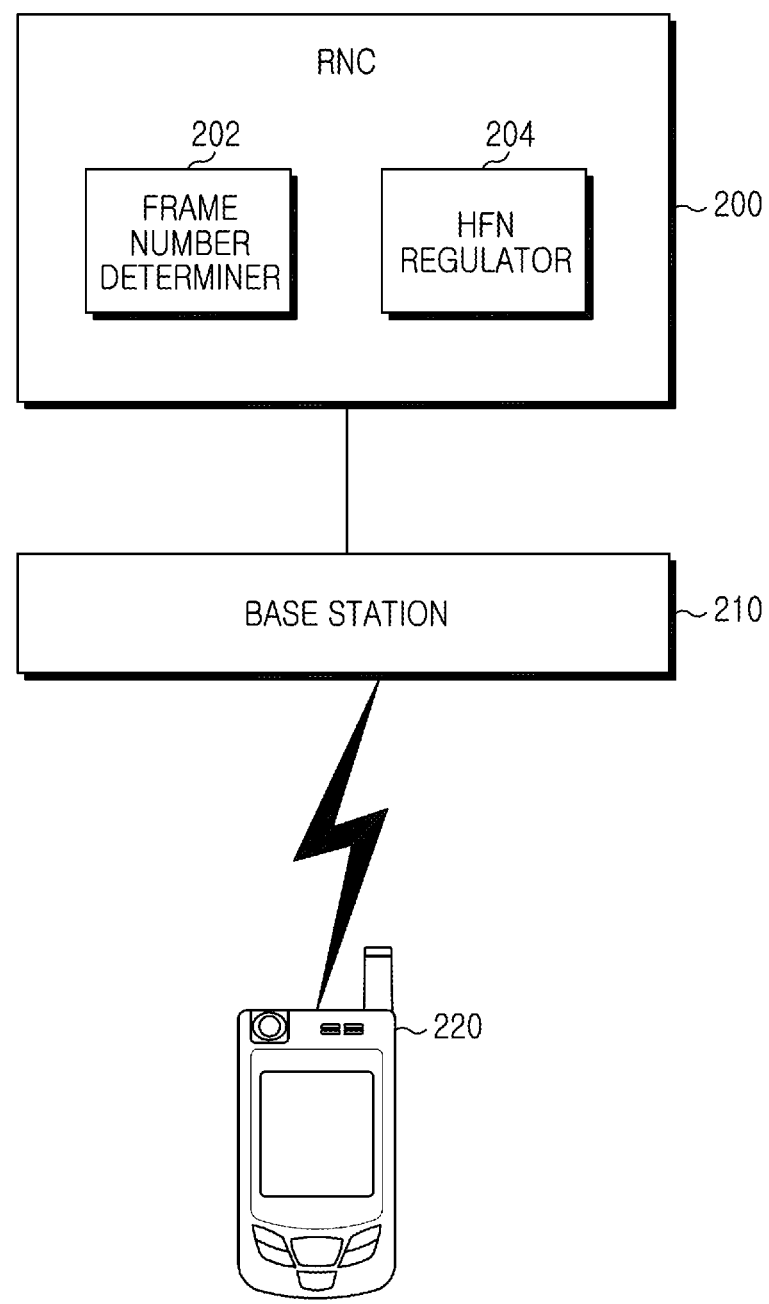
FIG. 2 is a diagram of a mobile communication system for providing a ciphering process according to an exemplary embodiment of the present invention.

FIG. 2 is a diagram of a mobile communication system for providing a ciphering process according to an exemplary embodiment of the present invention.

Referring to FIG. 2, the mobile communication system includes an RNC 200, a base station 210, and a UE 220.

Operations of the mobile communication system are described below. To address abnormal ciphering and decoding caused by different HFN values of the UE 220, which increases the HFN, and the RNC 200 when a Radio Bearer (RB) Setup Complete is retransmitted and received from the UE 220 according to the poor uplink radio environment, the mobile communication system provides the same HFNs for ciphering between the UE 220 and the base station 210.

For normal ciphering and decoding in the poor uplink radio environment, the RNC 200 determines the HFN of the UE by examining the RFN of the movement time to a new physical channel and the RFN of a ciphering activation time. Thus, the RNC 200 determines an HFN control range for ciphering at the same time as the UE 220.

Accordingly, the RNC 200 includes a frame number determiner 202 and an HFN regulator 204.

The RNC 200 generates an RB Setup Request including an activation time that indicates the movement time to the physical channel based on a Connection Frame Number (CFN) and transmits the RB Setup Request to the UE 220 and the base station 210.

The RNC 200 receives the RB Setup Complete used as an uplink message from the UE 220. When the poor uplink radio environment causes error in the RB Setup Complete transmission, the UE 220 retransmits the RB Setup Complete. When the RNC 200 receives the RB Setup Complete retransmitted from the UE 220 after the ciphering activation time, the RNC 200 determines that a ciphering error is likely to occur because of the HFN changed based on the CFN (0~255) of a cycle of 256. Thus, the RNC 200 determines the difference between the HFN of the UE 220 and the HFN of the RNC 200, increases the HFN of the RNC 200 by the determined difference, provides the same HFN, and thus carries out the ciphering process. That is, the RNC 200 modifies its HFN value to be the same HFN value of the UE 220.

The frame number determiner 202 of the RNC 200 determines whether the RB Setup Complete is received after the ciphering activation time of the UE 220.

In an exemplary implementation, the frame number determiner 202 uses a count RFN that is not affected by the CFN cycle.

The frame number determiner 202 determines whether the RB Setup Complete is received from the UE 220 after the ciphering activation time, by using the RFN value corresponding to the time that indicates the movement time to the physical channel and the RFN value corresponding to the ciphering activation time. The frame number determiner 202 also determines the difference between the HFN of the UE 220 and the HFN of the RNC 200, increases the HFN of the RNC 200 by the determined difference, and thus provides the same HFN.

In more detail, the frame number determiner 202 may determine the difference between the CFN corresponding to the movement time to the new physical channel and the current CFN, and may acquire the RFN value corresponding to the movement time to the physical channel by adding the difference of the CFN corresponding to the movement time to the new physical channel and the current CFN with the current RFN. The RFN value corresponding to the movement time to the physical channel may be expressed as follows:

$$\text{RFN in "activation time"} = \text{current RFN} + (\text{CFN of "activation time"} + 256 - \text{current CFN}) \% 256$$

The frame number determiner 202 may acquire the RFN of the ciphering activation time using the RFN value when the RB Setup Complete is received, the CFN corresponding to the ciphering activation time, and the CFN when the RB Setup Complete is received. The RFN of the ciphering activation time may be expressed as follows:

RFN in "ciphering activation time"=RFN when RB Setup Complete is received+(CFN of "ciphering activation time"+256−CFN when RB Setup Complete is received) % 256

The frame number determiner 202 determines whether to modify the HFN of the RNC 200 to be the same HFN of the UE 220 using the above-described information. Upon determining a necessity to modify the HFN of the RNC 200, the frame number determiner 202 determines a number of corresponding HFN modifications.

The number of the HFN modifications of the RNC 200 may be expressed as follows:

count of increasing HFN=((RFN in "ciphering activation time"+4096−RFN in "activation time") % 4096)/256

The HFN regulator 204 of the RNC 200 modifies the corresponding HFN according to the number of HFN modifications of the RNC 200 as determined by the frame number determiner 202, and thus enables the ciphering process of the RNC 200.

When a delay occurs in the received RB Setup Complete and the ciphering activation time is mapped to the RFN of a value after a cycle of 256 from the RFN of the time that indicates the movement time to the physical channel, the UE increases the HFN because of the delay. The HFN regulator 204 conducts the ciphering by increasing the HFN of the RNC 200. If there is severe transmission delay, the cycle of 256 may be passed for several times. In this case, the HFN is increased by the number of times.

While the RNC 200 may function as the frame number determiner 202 and the HFN regulator 204, the present invention is not limited thereto. Accordingly, the frame number determiner 202 and the HFN regulator 204 may be separately provided. However, the RNC 200 may process all of the functions of the frame number determiner 202 and the HFN regulator 204.

When the RB Setup Request is received, the UE 220 shifts to a new physical channel and transmits the RB Setup Complete including the ciphering activation time to the RNC 200 via the base station 210.

The UE 220 carries out the ciphering process by determining the ciphering activation time.

The apparatus for regulating the HFN for the same ciphering between the UE and the base station using the RFN of the movement time to the new physical channel and the RFN of the ciphering activation time to enable the ciphering process in order to protect data transmitted in the poor uplink radio environment of the mobile communication system has been described above. A method for regulating the HFN for the same ciphering between the UE and the base station using the apparatus according to an exemplary embodiment of the present invention is described below.

Figure 3:
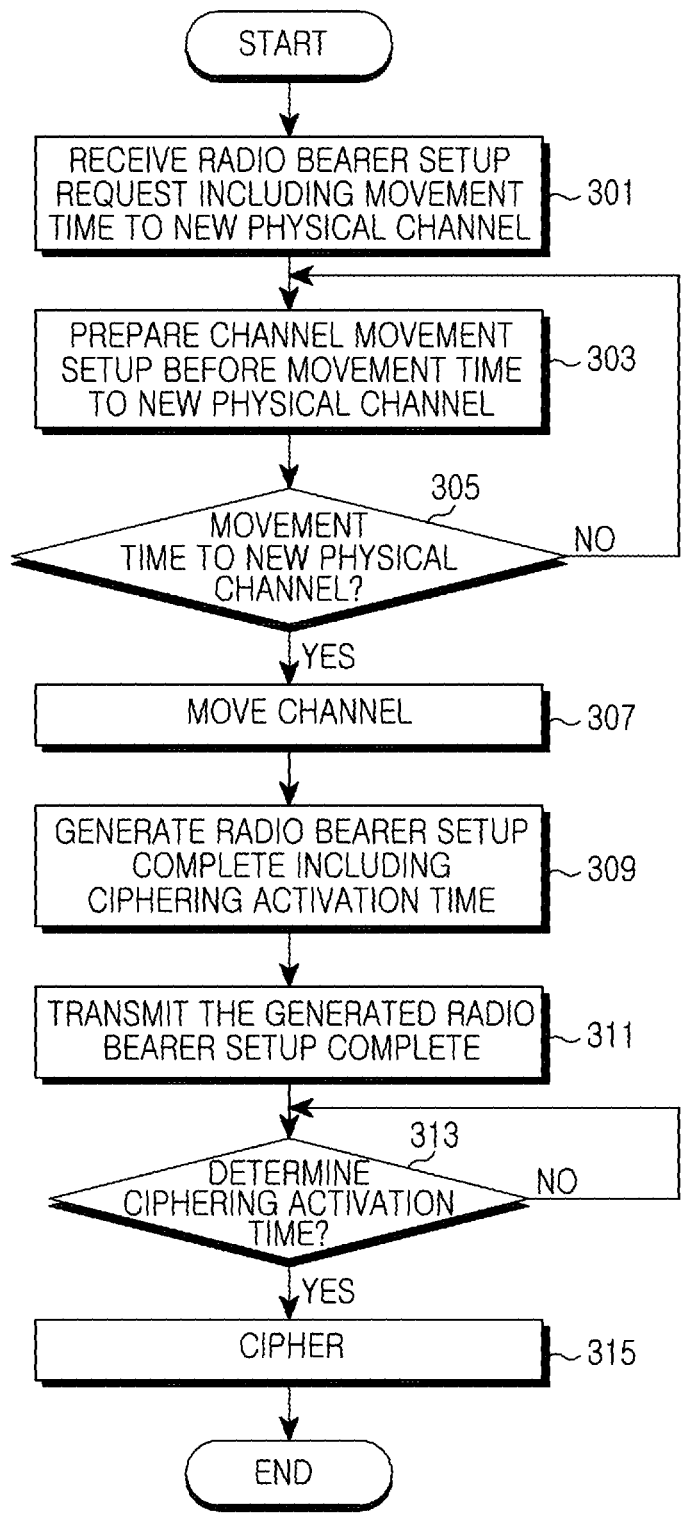
FIG. 3 is a flowchart of operations of a user equipment for a ciphering process according to an exemplary embodiment of the present invention.

FIG. 3 is a flowchart of operations of the UE for a ciphering process according to an exemplary embodiment of the present invention.

Referring to FIG. 3, in step 301, the UE receives a Radio Resource Control (RRC) Radio Bearer Setup including an activation time that indicates a movement time to a new physical channel.

Herein, a Wideband Code Division Multiple Access (WCDMA) system requires a new physical channel for the Radio Bearer Setup for transmitting data such as voice or a packet, and the time that indicates the movement time to the physical channel which is the movement time to the new physical channel. The time that indicates the movement to the physical channel is received from the RNC.

After preparing the setup to move to the new physical channel in step 303, the UE determines the time to move to the physical channel in step 305.

If the time of the movement to the physical channel is not determined in step 305, the UE re-performs step 303.

If the time of the movement to the physical channel is determined in step 305, the UE moves to the new physical channel in step 307. For example, the UE prepares the setup for the channel shift until the movement time to the physical channel. When the movement time occurs, the UE performs the channel shift.

In step 309, the UE moving to the channel generates an RRC Radio Bearer Setup Complete to be transmitted to the RNC. Accordingly, the UE sets and includes the ciphering activation time into the Radio Bearer Setup Complete.

The UE transmits the Radio Bearer Setup Complete generated in step 309 to the RNC in step 311 and determines whether it is the ciphering activation time in step 313.

If it is determined that it is not the ciphering activation time in step 313, the UE re-performs step 313.

If it is determined that it is the ciphering activation time in step 313, the UE performs the ciphering process in step 315.

The UE terminates the process.

Figure 4:
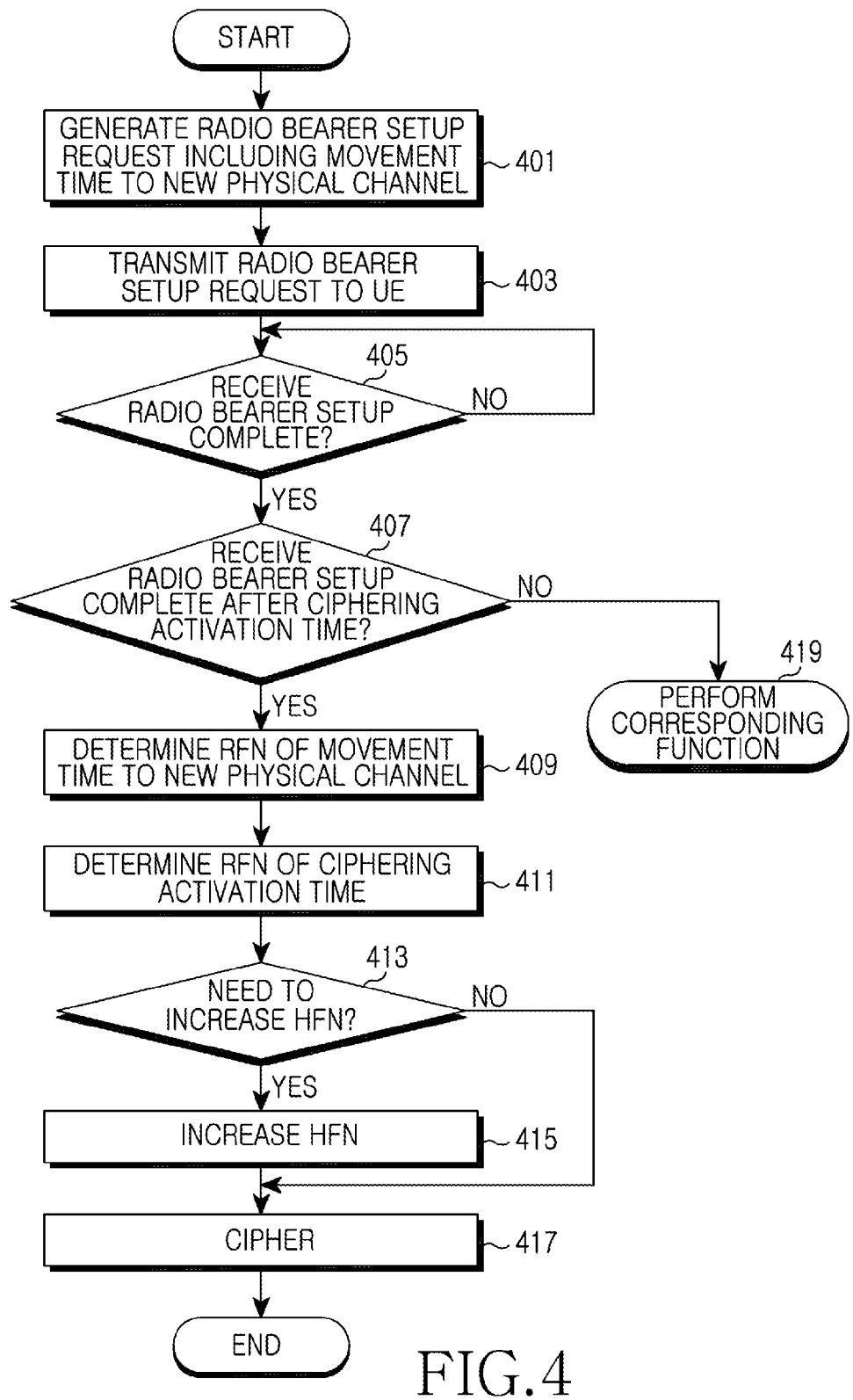
FIG. 4 is a flowchart of operations of a radio network controller for a ciphering process according to an exemplary embodiment of the present invention.

FIG. 4 is a flowchart of operations of an RNC for a ciphering process according to an exemplary embodiment of the present invention.

Referring to FIG. 4, in step 401, the RNC generates an RRC Radio Bearer Setup request including an activation time that indicates a movement time to a new physical channel. Herein, a WCDMA system requires a new physical channel for the Radio Bearer Setup for transmitting data, such as voice or a packet, and a time that indicates the movement time to the physical channel which is the movement time to the new physical channel. The RNC concurrently informs a UE and a base station of the time that indicates the movement time to the physical channel with a CFN so that the UE and the base station may move to the physical channel at the same time.

The RNC transmits the RRC Radio Bearer Setup request to the UE in step 403 and determines whether the RRC Radio Bearer Setup Complete is received from the UE in step 405.

If it is determined that the RRC Radio Bearer Setup Complete is not received in step 405, the RNC re-performs step 405 until the RRC Radio Bearer Setup Complete is received.

If it is determined that the RRC Radio Bearer Setup Complete is received in step 405, the RNC determines whether the RRC Radio Bearer Setup Complete is received after a ciphering activation time in step 407.

Herein, if the time for receiving the RRC Radio Bearer Setup Complete that is retransmitted due to the poor uplink radio environment exceeds the ciphering activation time transmitted from the UE, a possible occurrence of the ciphering error caused by an HFN (i.e., the different HFNs of the UE and the RNC) changed according to a CFN (0~255) of a cycle of 256 is examined in step 407.

If it is determined that the RRC Radio Bearer Setup Complete is not received after the ciphering activation time in step 407, the RNC performs a corresponding function (e.g., a conventional ciphering process) in step 419.

If it is determined that the RRC Radio Bearer Setup Complete is received after the ciphering activation time in step 407, the RNC determines the RFN of the movement time to the new physical channel of the received RRC Radio Bearer Setup Complete in step 409. The RNC then determines the RFN of the ciphering activation time in step 411.

Herein, the RNC conducts the ciphering process with the same HFN value as the UE using a counter RFN not affected by the CFN cycle. The RFN is a counter used by the RNC, which ranges between 0~4095, and has a frame unit similar to the CFN (i.e., the RFN has a counter of 16 times the CFN cycle).

To maintain the HFN for the same ciphering as the UE, the RNC determines an HFN control range for the ciphering at the same time as the UE by determining the HFN corresponding to the RFN of the ciphering activation time of the UE using the RFN of the movement time to the new physical channel and the RFN of the ciphering activation time.

In step 413, the RNC determines whether it is necessary to modify the HFN. Herein, as the RRC Radio Bearer Setup Complete is received from the UE, in step 413 the RNC determines whether the ciphering process is impossible because the HFN of the UE increased in every cycle of the CFN differs from the HFN of the RNC.

If it is determined that the HFN modification is unnecessary in step 413, in step 417 the RNC determines that the RRC Radio Bearer Setup Complete is received from the UE before the HFN is changed and performs the same ciphering process as a conventional RNC.

If it is determined that the HFN needs to be modified in step 413, in step 415 the RNC determines a late reception of the RRC Radio Bearer Setup Complete from the UE, determines a difference in the HFN of the UE and the HFN of the RNC, and provides the same HFN by increasing the HFN of the RNC by the determined difference.

In step 417, the RNC prevents a ciphering decoding error caused by the different HFNs by ciphering with the UE.

The RNC terminates the process.

Figure 5:
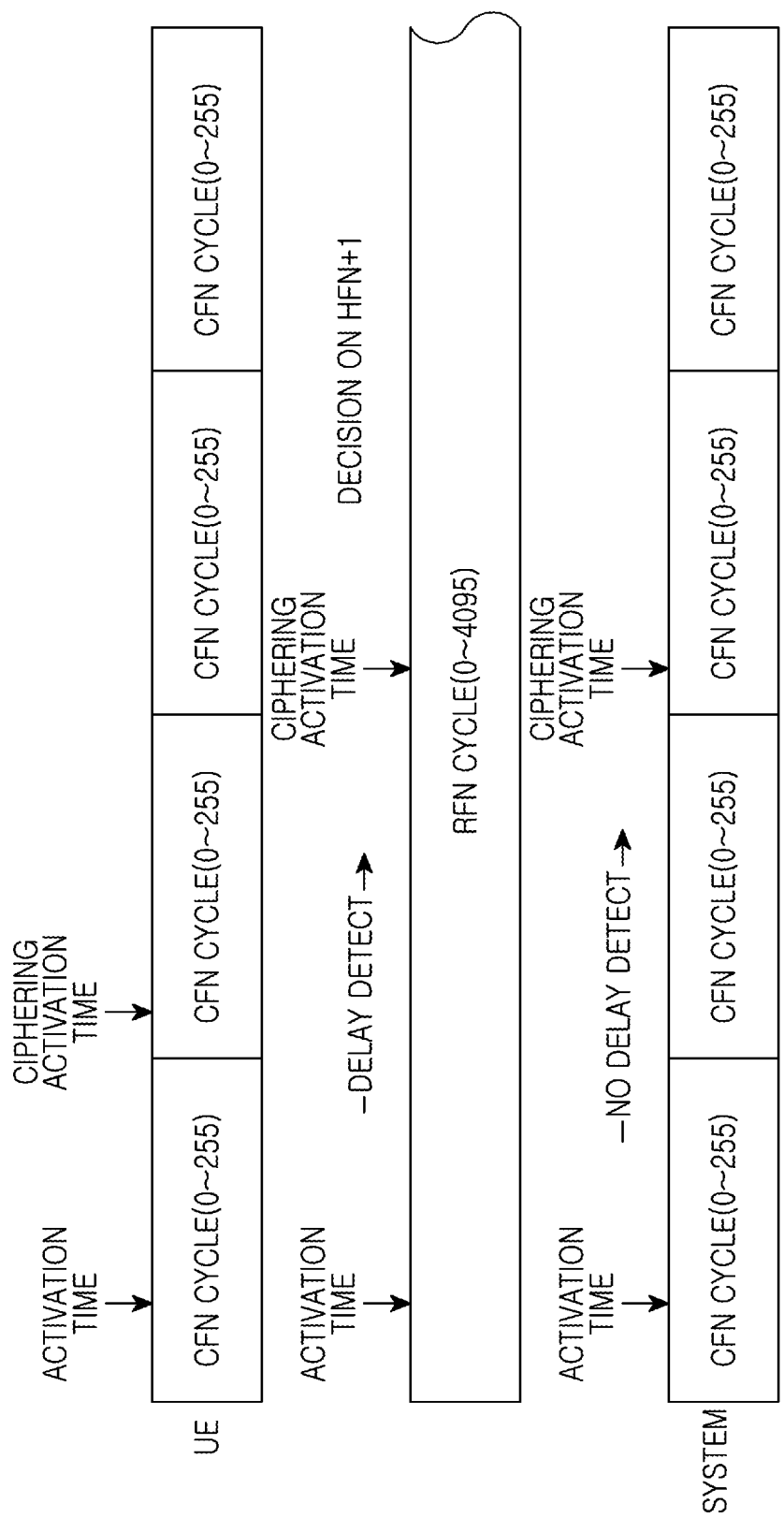
FIG. 5 is a diagram of a Hyper Frame Number (HFN) compensation process for ciphering in a poor uplink radio environment in a mobile communication system according to an exemplary embodiment of the present invention.

FIG. 5 is a diagram of an HFN compensation process for ciphering in a poor uplink radio environment in a mobile communication system according to an exemplary embodiment of the present invention.

Referring to FIG. 5, when a Radio Bearer Setup request for a ciphering process as described above is received, a UE moves to a new physical channel, sets a ciphering activation time, and transmits a Radio Bearer Setup Complete including the set ciphering activation time to the RNC via a base station.

The UE performs the ciphering process by determining the ciphering activation time. After determining the ciphering activation time, the UE increases the HFN by one every time a cycle of the CFN is changed.

Meanwhile, the RNC generates the Radio Bearer Setup request including the activation time that indicates a movement time to the physical channel, transmits the generated Radio Bearer Setup request to the UE, and determines whether the Radio Bearer Setup Complete is received from the UE.

The Radio Bearer Setup Complete used as an uplink message is retransmitted because of a poor uplink radio environment. After transmitting the Radio Bearer Setup Complete, the UE determines the ciphering activation time. If the ciphering process is performed, the UE increases the HFN by one after the ciphering activation time, every time the cycle of the CFN changes.

When the RNC receives the Radio Bearer Setup Complete late while the HFN of the UE is increased, the HFN of the UE may be different from the HFN of the RNC and thus the ciphering process cannot be performed.

To address the problem of the ciphering process, with the counter RFN not affected by the CFN cycle, the RNC determines whether the Radio Bearer Setup Complete is received after the ciphering activation time is transmitted from the UE by using the RFN value corresponding to the time that indicates the movement time to the physical channel and the RFN value corresponding to the ciphering activation time, determines the difference of the HFN of the UE and the HFN of the RNC, and provides the same HFN by increasing the HFN of the RNC by the determined difference.

As described above, to enable a ciphering process to protect data transmitted under a poor uplink radio environment in a mobile communication system, HFNs for the same ciphering between a UE and the base station are adjusted as the same. Thus, it is possible to address the impossible ciphering caused by the difference from an HFN value increased by the UE in a conventional mobile communication system. Further, the UE may prevent voice and an image from being compromised when it cannot normally cipher and decode data encoded and transmitted from a system because of the HFN difference.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. An apparatus for ciphering uplink data in a mobile communication system, the apparatus comprising:
a Radio Network Controller (RNC) for, when receiving a Radio Bearer Setup Complete after a ciphering activation time, determining a Hyper Frame Number (HFN) value of a User Equipment (UE) and changing an HFN value of the RNC to the determined HFN value of the UE,
wherein, the changing of the HFN value of the RNC comprises determining, by the RNC, an HFN modification value and changing the HFN value of the RNC to the determined HFN value of the UE using the HFN modification value,
wherein the RNC determines the HFN modification value by using a difference between an RNC Frame Number (RFN) corresponding to the ciphering activation time and an RFN corresponding to a movement time to a physical channel, and
wherein the RNC determines the RFN of the ciphering activation time based on an RFN corresponding to when the Radio Bearer Setup Complete is received, a Connection Frame Number (CFN) of the ciphering activation time from the Radio Bearer Setup Complete, a CFN of when the Radio Bearer Setup Complete is received, and a predefined CFN range value.

2. The apparatus of claim 1, wherein the RNC determines the HFN modification value based on the following equation:

$$\text{HFN modification value} = ((\text{RFN in ciphering activation time} + 4096 - \text{RFN in movement time to physical channel}) \% 4096)/256.$$

3. The apparatus of claim 2, wherein the RNC determines the RFN in the ciphering activation time based on the following equation:

$$\text{RFN in ciphering activation time} = \text{RFN when receiving Radio Bearer Setup Complete} + (\text{Connection Frame Number (CFN) in ciphering activation time} + 256 - \text{CFN when receiving Radio Bearer Setup Complete}) \% 256.$$

4. The apparatus of claim 2, wherein the RNC determines the RFN in the movement time to the physical channel based on the following equation:

> RFN in movement time to physical channel=current RFN +(Connection Frame Number (CFN) in movement time to physical channel+256−current CFN) % 256.

5. A method for ciphering uplink data in a mobile communication system, the method comprising:
   when receiving a Radio Bearer Setup Complete after a ciphering activation time, determining a Hyper Frame Number (HFN) value of a User Equipment (UE); and
   changing an HFN value of a Radio Network Controller (RNC) to the determined HFN value of the UE,
   wherein the changing of the HFN value of the RNC to the determined HFN value of the UE comprises:
      determining whether to modify the HFN value of the RNC; and
      when determining to modify the HFN value of the RNC, determining an HFN modification value,
   wherein the HFN modification value is determined by a difference between an RNC Frame Number (RFN) corresponding to the ciphering activation time and an RFN corresponding to a movement time to a physical channel, and
   wherein the RNC determines the RFN of the ciphering activation time based on an RFN corresponding to when the Radio Bearer Setup Complete is received, a Connection Frame Number (CFN) of the ciphering activation time from the Radio Bearer Setup Complete, a CFN of when the Radio Bearer Setup Complete is received, and a predefined CFN range value.

6. The method of claim 5, wherein the HFN modification value is determined based on the following equation:

> HFN modification value=((RFN in ciphering activation time+4096−RFN in movement time to physical channel) % 4096)/256.

7. The method of claim 6, wherein the RFN in the ciphering activation time is determined based on the following equation:

> RFN in ciphering activation time=RFN when receiving Radio Bearer Setup Complete+(Connection Frame Number (CFN) in ciphering activation time+256−CFN when receiving Radio Bearer Setup Complete) % 256.

8. The method of claim 6, wherein the RFN in the movement time to the physical channel is determined based on the following equation:

> RFN in movement time to physical channel=current RFN+(Connection Frame Number (CFN) in movement time to physical channel+256−current CFN) % 256.

9. An apparatus for ciphering uplink data in a mobile communication system, the apparatus comprising:
   a Radio Network Controller (RNC) including a frame number determiner configured to determine whether a Radio Bearer Setup Complete is received from a User Equipment (UE) after a ciphering activation time,
   wherein the RNC determines a Hyper Frame Number (HFN) value of the UE and changes an HFN value of the RNC to the determined HFN value of the UE, when the Radio Bearer Setup Complete is received after the ciphering activation time,
   wherein the determined HFN value of the UE is determined by using a difference between an RNC Frame Number (RFN) corresponding to the ciphering activation time and an RFN corresponding to a movement time to a physical channel, and
   wherein the frame number determiner determines the RFN of the ciphering activation time based on an RFN corresponding to when the Radio Bearer Setup Complete is received, a Connection Frame Number (CFN) of the ciphering activation time from the Radio Bearer Setup Complete, a CFN of when the Radio Bearer Setup Complete is received, and a predefined CFN range value.

10. The apparatus of claim 9, wherein the frame number determiner determines a difference between the HFN value of the UE and the HFN value of the RNC and increases the HFN of the RNC by the determined difference.

11. The apparatus of claim 9, wherein the frame number determiner determines whether to modify the HFN value of the RNC to the determined HFN value of the UE.

12. The apparatus of claim 11, wherein, when a determination to modify the HFN value of the RNC to the determined HFN value of the UE is made, an HFN regulator of the RNC modifies a corresponding HFN value according to a number of HFN modifications determined by the frame number determiner.

13. The apparatus of claim 12, wherein the frame number determiner determines the number of HFN modifications based on the following equation:

> number of HFN modifications=((RFN in ciphering activation time+4096−RFN in movement time to physical channel) % 4096)/256.

14. The apparatus of claim 13, wherein the frame number determiner determines the RFN in the ciphering activation time based on the following equation:

> RFN in ciphering activation time=RFN when receiving Radio Bearer Setup Complete+(Connection Frame Number (CFN) in ciphering activation time+256−CFN when receiving Radio Bearer Setup Complete) % 256.

15. The apparatus of claim 13, wherein the frame number determiner determines the RFN in the movement time to the physical channel based on the following equation:

> RFN in movement time to physical channel=current RFN+(Connection Frame Number (CFN) in movement time to physical channel+256−current CFN) % 256.

* * * * *